United States Patent [19]

Melamed et al.

[11] Patent Number: 5,264,957
[45] Date of Patent: Nov. 23, 1993

[54] ELECTRICALLY CONTROLLED MULTIPLE DISPERSION (ZOOM) DEVICE

[75] Inventors: Nathan T. Melamed; Milton S. Gottlieb, both of Pittsburgh, Pa.

[73] Assignee: The United States of America as represented by the Secretary of the Air Force, Washington, D.C.

[21] Appl. No.: 908,111

[22] Filed: Jul. 2, 1992

[51] Int. Cl.$^5$ .................. G02F 1/33; G02B 5/04
[52] U.S. Cl. .................. 359/308; 359/309; 359/313; 359/568; 359/615
[58] Field of Search .......... 359/308, 309, 313, 285, 359/568, 615, 306, 314

[56] References Cited

U.S. PATENT DOCUMENTS

| | | | |
|---|---|---|---|
| 3,437,951 | 4/1969 | Dailey | 331/94.5 |
| 3,462,212 | 8/1969 | Denton | 359/309 |
| 3,502,879 | 3/1970 | Vallese | 250/199 |
| 3,544,806 | 12/1970 | De Maria et al. | 359/285 |
| 3,609,009 | 9/1971 | Lohman | 359/313 |
| 3,615,449 | 10/1971 | Greenaway | 96/35 |
| 3,944,334 | 3/1976 | Yano et al. | 359/308 |
| 3,944,335 | 3/1976 | Saito et al. | 359/308 |
| 4,150,880 | 4/1979 | Howe et al. | 359/309 |
| 4,582,397 | 4/1986 | Chang | 359/321 |
| 4,639,092 | 1/1987 | Gottlieb et al. | 359/308 |
| 4,653,869 | 3/1987 | Gottlieb et al. | 359/308 |
| 4,798,449 | 1/1989 | Vichon et al. | 359/309 |
| 4,886,346 | 12/1989 | Gottlieb et al. | 359/285 |

OTHER PUBLICATIONS

Yano, et al.: "Acoustooptic TeO$_2$ Tunable Filter Using Far-Off-Axis Anisotropic Bragg Diffraction", Applied Optics vol. 15, No. 9 Sep. 1976 p. 2250.
Fujii, et al.; "Acousto Optic Tunable Filter With Controllable Passband", J. of Applied Physics vol. 46 No. 11, Nov. 1975 p. 5046.

*Primary Examiner*—Martin Lerner
*Assistant Examiner*—Evelyn A. Lester
*Attorney, Agent, or Firm*—Bernard E. Franz; Thomas L. Kundert

[57] ABSTRACT

The optical device can examine a spectrum at low resolution and subsequently choose a portion of that spectrum to be examined at higher resolution, using a single detector array for both spectra. The latter spectrum can be chosen to be arbitrarily anywhere within the low resolution spectrum. The device comprises a source of input light, a wedged shaped dispersive device, a first reflective mirror, a second reflective mirror, a RF generator connected to the dispersive device, and a detector array. In operation, the dispersive device provides a low dispersion spectrum in the zero order light when the source of light is impinged upon it. When the RF generator is turned on, a second spectrum which is diffracted is obtained. This will be the high resolution spectrum. By operating near 100% diffraction efficiency, it is possible to switch from one spectrum to the other. By adjusting the RF frequency the band center of the high resolution spectrum can be varied to fall anywhere within the low resolution spectrum. Since the two spectra will not normally physically fall in the same place, the zero order spectrum is reflected by a first mirror onto the detector array and the diffracted spectrum is reflected by a second mirror on to the detector array so that the two spectra overlay and fall in the same detector array.

2 Claims, 1 Drawing Sheet

ELECTRICALLY CONTROLLED MULTIPLE DISPERSION (ZOOM) DEVICE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to acousto-optic devices, and more particularly to an electrically controlled multiple dispersion (zoom) device.

Acousto-optic devices use acoustic power to perform optical manipulations. In general, the interaction between light and sound occurs through the elasto-optic effect. The acoustic wave establishes a phase grating within the material which causes the entering light beam to be diffracted. By varying the applied acoustic frequency, the grating spacing is varied, allowing the optical beam to be manipulated. Cells of this type are referred to as Bragg cells and may differ according to the type of material used. Bragg cells fabricated from materials whose indices of refraction are isotropic are referred to as normal isotropic Bragg cells, whereas cells fabricated from birefringent materials are called anisotropic Bragg cells. The distinction is an important one and leads to different design considerations.

In a normal Bragg cell, the angle of incidence is equal to the angle of diffraction. Changing the diffraction angle—for example, by changing the grating spacing—requires an equal change in the incident angle relative to the acoustic wavefront. Hence, either the input beam direction or the acoustic wavefront must be steered to maintain the phase matching condition—that is, to conserve momentum. In an anistropic Bragg cell, the input angle remains essentially fixed over a wide range of acoustic frequencies around the design center, and the optical beam can undergo considerable manipulation without much change in the input beam direction. The latter clearly has an advantage over the isotropic Bragg cell and is now widely used as the preferred mechanism.

There are important situations encountered when it is desirable to examine a spectrum at low resolution and subsequently choose a portion of that spectrum to be examined at higher resolution. The latter spectrum should be capable of being chosen arbitrarily to be anywhere within the low resolution spectrum. To accomplish this with a single detector array is difficult if we wish to use the entire array for both the high and low resolution measurements. One must have a device whose dispersion can be changed for one or the other measurement. Conventional "dispersive devices" such as gratings or prisms have dispersions that are fixed by their geometric design, and changes must be made by either changing their geometry, or by switching from one grating or prism to another. The AODLF (Acousto-Optic Dispersive Light Filter), which is an electronically controlled dispersive device, also has a dispersion that is not easily changed once the design has been set.

An AODLF is an acousto-optic spectroscopic device that exploits the optical birefringence properties of certain unique acousto-optic crystals, such as thallium arsenic selenide. The structure and operation of an AODLF is disclosed in U.S. Pat. Nos. 4,639,092; 4,653,869 and 4,886,346, hereby incorporated by reference.

An AODLF functions similar to a conventional diffraction grating. But in an AODLF, the diffraction grating or spacing is electronically determined by the frequency of the acoustic signal applied to the AODLF. A crucial difference between a conventional diffraction grating and an AODLF is that the AODLF operates as a birefringent device, in which the polarization of the diffracted light is rotated 90° with respect to that of the incident light, and the refractive indices are different in the acousto-optical crystal for the incident light and the diffracted light.

The following U.S. patents are of interest.
4,653,869—Gottlieb et al issued Mar. 31, 1987
4,639,092—Gottlieb et al issued Jan. 27, 1987
4,886,346—Gottlieb et al issued Dec. 12, 1989
3,437,951—Dailey issued Apr. 8, 1969
3,502,879—Vallese issued Mar. 24, 1970
3,615,449—Greenaway issued Oct. 26, 1971.

The patent to Gottlieb et al teaches a method and apparatus for increasing the angular aperture of an AODLF in which acoustic waves of differing frequencies are launched into a crystal at differing angles to each other. Input light waves phase match with corresponding waves of the acoustic frequencies so that the angular aperture is enlarged.

The patent to Dailey teaches a laser, wherein a prism is located between the laser generator and two reflective surfaces. The beam through the prism may be refracted at different angles when the RF signal connected to the prism is varied. The patent to Vallese teaches a laser device, in which the spectrum passing through an ultrasonic cell is diffracted by varying the electronic signal to the electronic cell. The patent to Greenaway teaches a method of generating high area density periodic arrays by diffraction imaging employing a wedge prism.

SUMMARY OF THE INVENTION

An objective of the invention is to provide an optical device which can examine a spectrum at low resolution and subsequently choose a portion of that spectrum to be examined at higher resolution, using a single detector array for both spectra. The latter spectrum should be capable of being chosen to be arbitrarily anywhere within the low resolution spectrum.

The AODLF, which is an electronically controlled dispersive device, has a dispersion that is not easily changed once the design has been set; however, because of the electronic control capability, a two level variable dispersion device can be made, in the manner described below.

The device according to the invention comprises a source of input light, a wedge shaped dispersive device, a first reflective mirror, a second reflective mirror, an RF generator connected to the dispersive device, and a detector array.

In operation, the dispersive device provides a low dispersion spectrum in the zero order light when the source of light is impinged upon it. When the RF generator is turned on, a second spectrum, which is diffracted, is obtained. This will be the high resolution spectrum. By operating near 100% diffraction efficiency, it is possible to switch from one spectrum to the other. By adjusting the RF frequency, the band center of the high resolution spectrum can be varied to fall anywhere within the low resolution spectrum. Since the two spectra will not normally physically fall in the same place, the zero order spectrum is reflected by a first mirror onto the detector array and the diffracted spectrum is reflected by a second mirror onto the detector array, so that the two spectra overlay and fall in the same detector array. Thus, the device can electronically control a dispersive device so that using a single detector array, it can switch between a low and high resolution readout.

DETAILED DESCRIPTION

Figure 1:
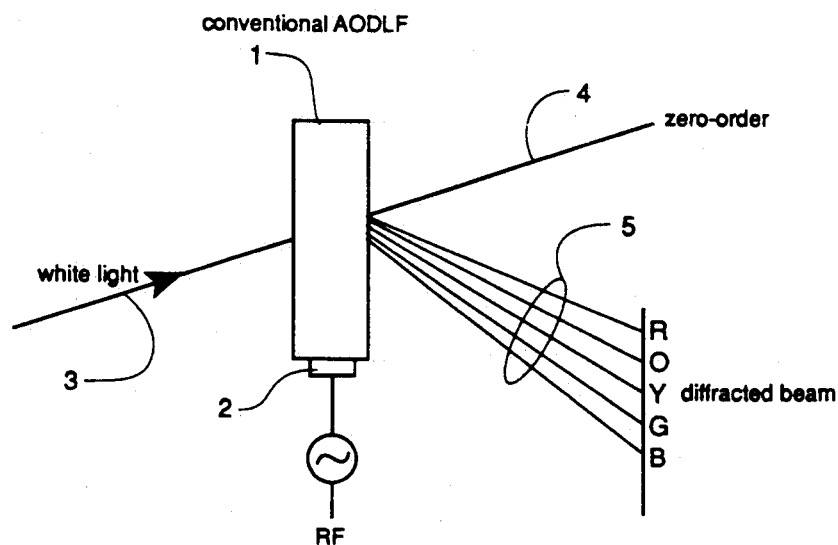
FIG. 1 is a diagram showing a conventional prior art AODLF.

Referring to FIG. 1, an AODLF includes acoustic means 2 for launching into a crystal 1 an acoustic wave of frequency RF from an electronic source. Light from a beam 3 incident to an input face at an angle is diffracted from the AODLF in a zero order beam 4 and a diffracted beam 5.

The basic features of the AODLF is that a) dispersion can be turned on or off electronically, and b) it exhibits a zero order spectrum, so that the ratio of the signal in zero order to that in the diffracted (dispersed) order can be varied from zero to nearly 100% by varying the drive power. The input and output faces of the AODLF are normally parallel, as shown in FIG. 1.

Figure 2:
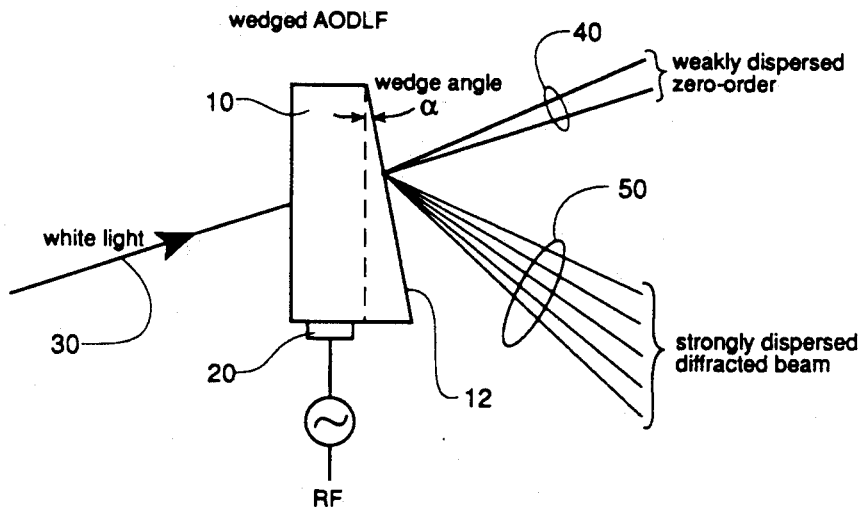
FIG. 2 is a diagram showing a wedged AODLF.

If we now tilt either the input or the output face of the AODLF with respect to the other as shown in FIG. 2, we will obtain some dispersion due to the prism formed. FIG. 2 shows an AODLF 10 having its output face 12 tilted at an angle α with respect to the input face. A signal of frequency RF from an electronic source is supplied via the acoustic means 20 for launching an acoustic wave into the crystal 10. A white light input beam 30 enters the input face. The tilt of the output face 12 provides the low dispersion spectrum in the zero order light beam 40. We can fix this dispersion at a suitable value by designing the appropriate wedge angle α. If we now turn on the RF, we will obtain a second spectrum due to the diffracted beam 50, at the expense of the zero order. This will be the high resolution spectrum. By operating near 100% diffraction efficiency, we can switch from one spectrum to the other. By adjusting the RF frequency, we can vary the band center of the high resolution spectrum to fall anywhere within the low resolution spectrum, i.e. anywhere within the region of interest.

Figure 3:
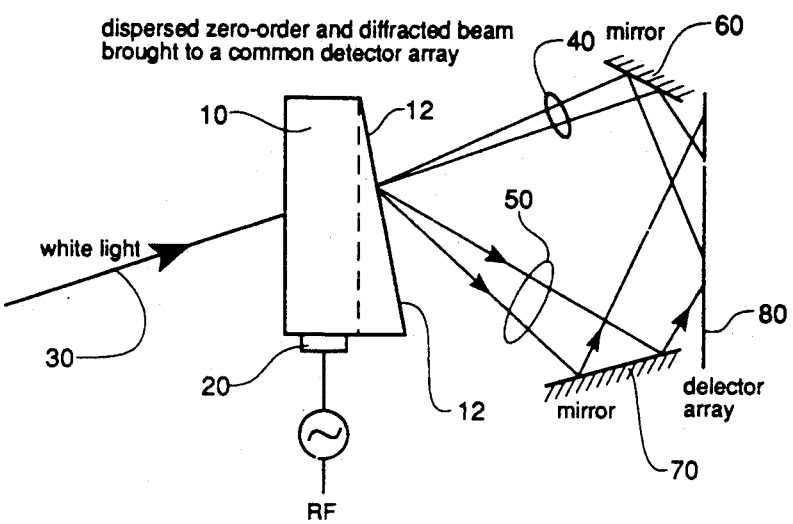
FIG. 3 is a diagram showing a wedged AODLF according to the invention.

The two spectra will not normally physically fall in the same place, since the diffracted beam emerges at a different angle from the zero order. Since our aim is to use a single detector array for both spectra, we can easily deflect one or the other spectrum (by means of a mirror, for example) so that the two spectra overlap and fall on the same detector array. The device according to the invention shown in FIG. 3 is the same as that shown in FIG. 2, with a first mirror 60 to deflect the beam 40, and a second mirror 70 to deflect the beam 50. The two deflected beams fall on a common detector array 80.

Since we may not always obtain 100% efficiency, there may be some residual low resolution spectrum with the high resolution spectrum that could confuse the readout. We can easily deal with this problem in any one of several ways, two of which are as follows: 1) we can modulate the RF so as to modulate the diffracted spectrum, and detect only the modulated signal; or 2) we can store the low resolution spectrum and subtract it from the high resolution spectrum, leaving only the latter. Other methods are possible.

SUMMARY

We have invented a device whereby we can electronically control a dispersive device so that, using a single detector array, we can switch between a low and high resolution readout. Moreover, we can arbitrarily choose the band center of the high resolution spectrum to correspond to an arbitrary region of interest within the low resolution spectrum. The device is expected to be of great value for certain applications.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. An acousto-optic dispersive light filter comprising:
    an optically birefringent crystal having an optic input face with an optic axis, an acoustic input face and an optic output face, one of said optic faces being tilted at a predetermined angle with respect to the other, thereby providing wedge shaped dispersive device; and
    a source of input light which is incident to the optical input face, an RF generator coupled to the dispersive device at the acoustic input face via means for launching an acoustic wave in the dispersive device, a first beam deflecting means, a second beam deflecting means, and a detector array;
    wherein in operation, the dispersive device provides a low dispersion spectrum in the zero order light when the source of light is impinged upon it, and wherein when the RF generator is turned on, a second spectrum which is diffracted is obtained as a high resolution spectrum, wherein it is possible to switch from one spectrum to the other, wherein by adjusting the RF frequency the band center of the high resolution spectrum can be varied to fall anywhere within the low resolution spectrum, wherein the first beam deflecting means is located to reflect the zero order spectrum onto the detector array, and the second beam deflecting means is located to reflect the diffracted spectra on to the detector array so that the two spectra overlay and fall in the same detector array;
    whereby the acousto-optic dispersive light filter can be electronically controlled so that using a single detector array, it can switch between a low and a high resolution readout.

2. An acousto-optic dispersive light filter according to claim 1, wherein the first beam deflecting means is a first reflective mirror, and the second beam deflecting means is a second reflective mirror.

* * * * *